United States Patent
Abishek Kumar et al.

(10) Patent No.: US 11,562,264 B2
(45) Date of Patent: Jan. 24, 2023

(54) SYSTEM AND METHOD FOR USING MACHINE LEARNING TO SELECT ONE OR MORE SUBMISSIONS FROM A PLURALITY OF SUBMISSIONS

(71) Applicant: Accenture Global Solutions Limited, Dublin (IE)

(72) Inventors: Surendra Abishek Kumar, New Delhi (IN); Rajeev Divakaran Nair, Bangalore (IN); Preetham Prabhu, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 397 days.

(21) Appl. No.: 16/776,167

(22) Filed: Jan. 29, 2020

(65) Prior Publication Data

US 2021/0232943 A1 Jul. 29, 2021

(51) Int. Cl.
*G06F 40/284* (2020.01)
*G06N 5/04* (2006.01)
*G06F 40/30* (2020.01)
*G06N 20/00* (2019.01)

(52) U.S. Cl.
CPC .............. *G06N 5/04* (2013.01); *G06F 40/284* (2020.01); *G06F 40/30* (2020.01); *G06N 20/00* (2019.01)

(58) Field of Classification Search
CPC .......... G06N 5/04; G06N 5/003; G06N 20/00; G06N 20/10; G06N 20/20; G06N 3/0445; G06N 3/0454; G06N 3/08; G06F 40/284; G06F 40/30
USPC ......................................................... 706/12
See application file for complete search history.

(56) References Cited

U.S. PATENT DOCUMENTS

| | | | | |
|---|---|---|---|---|
| 7,499,858 | B2 * | 3/2009 | Wolfel | G06F 16/64 707/999.102 |
| 8,175,864 | B1 * | 5/2012 | Dubiner | G06F 40/45 704/9 |
| 10,847,140 | B1 * | 11/2020 | Conner | G10L 15/1815 |
| 10,896,295 | B1 * | 1/2021 | Shenoy | G10L 15/187 |

(Continued)

OTHER PUBLICATIONS

Violos et al., Text Classification Using the N-Gram Graph Representation Model Over High Frequency Data Streams; Sep. 11, 2018; Frontiers in Applied Mathematics and Statistics; vol. 4; Frontiers; pp. 1-19.*

(Continued)

*Primary Examiner* — Andrew R Dyer
(74) *Attorney, Agent, or Firm* — Plumsea Law Group, LLC

(57) ABSTRACT

The disclosed system and method can improve a selection process, such as selecting winners in a contest or request for proposal, by narrowing the submissions to a reasonable number of top submissions that can be more meaningfully considered by a decision making body. By using machine learning during the selection process, human biases may be avoided, processing speed is significantly increased, accuracy of review and scoring is improved, and auditability of results is possible. The disclosed system and method improve the process of selecting one or more submissions by summarizing the submissions into a minimal number of words that can be substituted for the full text of the submission in downstream processes of the selection process. Fewer words used in the downstream processes can improve the speed and efficiency of the downstream processes.

20 Claims, 12 Drawing Sheets

(56) References Cited

U.S. PATENT DOCUMENTS

| | | | | |
|---|---|---|---|---|
| 10,978,056 | B1* | 4/2021 | Chai | G06F 16/3344 |
| 2013/0024184 | A1* | 1/2013 | Vogel | G06F 40/58 |
| | | | | 704/9 |
| 2013/0325436 | A1* | 12/2013 | Wang | G06F 40/274 |
| | | | | 704/9 |
| 2016/0350283 | A1* | 12/2016 | Carus | G06F 40/284 |
| 2016/0357851 | A1* | 12/2016 | Perkins | G06F 16/3329 |
| 2017/0161254 | A1* | 6/2017 | Gallé | G06F 40/56 |
| 2018/0047080 | A1* | 2/2018 | Piccus | G06F 8/20 |
| 2018/0060301 | A1* | 3/2018 | Li | G06F 40/289 |
| 2018/0329883 | A1* | 11/2018 | Leidner | G06F 40/247 |
| 2018/0341871 | A1* | 11/2018 | Maitra | G06N 3/0427 |
| 2019/0026106 | A1* | 1/2019 | Burton | G06N 20/00 |
| 2019/0156210 | A1* | 5/2019 | He | G06F 16/903 |
| 2019/0295544 | A1* | 9/2019 | Garcia | G10L 15/22 |
| 2019/0325081 | A1* | 10/2019 | Liu | G06F 16/951 |
| 2020/0065716 | A1* | 2/2020 | Aharonov | G06N 20/00 |
| 2020/0065770 | A1* | 2/2020 | Janapareddy | G06Q 10/1053 |
| 2020/0065857 | A1* | 2/2020 | Lagi | G06Q 30/0269 |
| 2020/0067861 | A1* | 2/2020 | Leddy | G06F 21/6245 |
| 2020/0126533 | A1* | 4/2020 | Doyle | G10L 15/1815 |
| 2020/0167604 | A1* | 5/2020 | Shah | G06F 16/35 |
| 2020/0357387 | A1* | 11/2020 | Prabhavalkar | G06N 3/0445 |
| 2020/0402501 | A1* | 12/2020 | Prabhavalkar | G10L 15/26 |
| 2021/0012145 | A1* | 1/2021 | Chaudhari | G06F 40/10 |
| 2021/0073302 | A1* | 3/2021 | Srinivasaraghavan | G06F 16/9535 |
| 2021/0120206 | A1* | 4/2021 | Liu | G06N 3/0445 |
| 2021/0149996 | A1* | 5/2021 | Bellegarda | G10L 15/1815 |
| 2021/0224306 | A1* | 7/2021 | Choudhary | G06F 3/0237 |

OTHER PUBLICATIONS

Zhang et al.; Distributed Language Modelling for N-best List Re-ranking; Jul. 2006; Proceedings of the 2006 Conference on Empirical Methods in Natural Language Processing (EMNLP 2006); Association for Computational Linguistics; pp. 216-223.*

* cited by examiner

SYSTEM AND METHOD FOR USING MACHINE LEARNING TO SELECT ONE OR MORE SUBMISSIONS FROM A PLURALITY OF SUBMISSIONS

TECHNICAL FIELD

The present disclosure generally relates to using machine learning to select one or more documents from a plurality of documents. More specifically, the present disclosure generally relates to using machine learning to select one or more documents having a description meeting predetermined parameters.

BACKGROUND

Many processes for sorting or ranking textual documents require time-consuming and/or labor-intensive analysis. For example, idea contests or requests for proposals (RFPs) can result in many submissions, e.g., in the hundreds or thousands, in a textual format. In these situations, it is very difficult for humans to meaningfully consider numerous submissions and/or lengthy submissions in a short amount of time when evaluating submissions in connection with a contest or RFP. For example, if a contest has 20,000 submissions and only one submission can win, it is difficult to consider all 20,000 submissions within a period of for example, 3 months. Additionally, humans tend to have biases when selecting and/or scoring submissions, which can contribute to undesirable outcomes. Even when using a computer to process the submissions, problems arise as the submissions may contain many words. The more words in a submission, the more time-consuming and complicated processing the submissions becomes.

There is a need in the art for a system and method that addresses the shortcomings discussed above.

SUMMARY

In one aspect, the disclosure provides a computer implemented method of using machine learning to select one or more submissions from a plurality of submissions. The method may include obtaining the plurality of submissions, each of the plurality of submissions comprising representing content; validating the content of the text, the validating performed for the plurality of submissions; preprocessing the text of the plurality of submissions, wherein preprocessing includes converting sentences within the submission into tokens; and automatically generating a summary for each submission of the plurality of submissions. Automatically generating a summary for each submission may include: (a) ranking each sentence of the text in an order such that the order arranged from sentences containing the most references to a predetermined topic to sentences containing fewest references to the predetermined topic; (b) generating a plurality of n-grams from each sentence; (c) randomizing the plurality of n-grams, wherein each sentence and each of the plurality of n-grams has a corresponding best fit line curve within a multidimensional space; and (d) determining which best fit line curve of the randomized n-grams is the closest in position to the best fit line curve of the corresponding sentence in the multidimensional space. The method may further include analyzing the plurality of submissions for uniqueness, the analyzing performed using the summaries generated for the plurality of submissions. The method may include determining whether each submission is unique or not unique, the determining based on the analyzing the summaries of the plurality of submissions for uniqueness. The method may include eliminating submissions that are not unique. The method may include using the summaries to analyze the unique submissions for the presence of a predefined technology. Analyzing the unique submissions for the presence of a predefined technology may comprise scoring the unique submissions based on the predefined technology present in the corresponding unique submissions, and reducing the unique submissions to a predetermined number or percentage of unique submissions having highest scores.

In yet another aspect, the disclosure provides a non-transitory computer readable medium storing software that may comprise instructions executable by one or more computers which, upon execution, cause the one or more computers to obtain the plurality of submissions, each of the plurality of submissions comprising text, the text representing content; validate the content of the text, the validating performed for the plurality of submissions; preprocess the text of the plurality of submissions, wherein preprocessing includes converting sentences within the submission into tokens; and automatically generate a summary for each submission of the plurality of submissions by. Automatically generating a summary for each submission may include: (a) ranking each sentence of the text in an order such that the order arranged from sentences containing the most references to a predetermined topic to sentences containing fewest references to the predetermined topic; (b) generating a plurality of n-grams from each sentence; (c) randomizing the plurality of n-grams, wherein each sentence and each of the plurality of n-grams has a corresponding best fit line curve within a multidimensional space; and (d) determining which best fit line curve of the randomized n-grams is the closest in position to the best fit line curve of the corresponding sentence in the multidimensional space. The instructions may further cause the one or more computers to analyze the plurality of submissions for uniqueness, the analyzing performed using the summaries generated for the plurality of submissions. The instructions may further cause the one or more computers to determine whether each submission is unique or not unique, the determining based on the analyzing the summaries of the plurality of submissions for uniqueness. The instructions may further cause the one or more computers to eliminate submissions that are not unique. The instructions may further cause the one or more computers to use the summaries to analyze the unique submissions for the presence of a predefined technology. Analyzing the unique submissions for the presence of a predefined technology may comprise scoring the unique submissions based on the predefined technology present in the corresponding unique submissions, and reducing the unique submissions to a predetermined number or percentage of unique submissions having highest scores.

In yet another aspect, the disclosure provides a system for using machine learning to select one or more submissions from a plurality of submissions to an innovation selection process, the submissions each containing text having content describing an innovation, which comprises one or more computers and one or more storage devices storing instructions that may be operable, when executed by the one or more computers, to cause the one or more computers to obtain the plurality of submissions, each of the plurality of submissions comprising text, the text representing content; validate the content of the text, the validating performed for the plurality of submissions; preprocess the text of the plurality of submissions, wherein preprocessing includes converting sentences within the submission into tokens; and automatically generate a summary for each submission of the plurality of submissions by. Automatically generating a summary for each submission may include: (a) ranking each sentence of the text in an order such that the order arranged from sentences containing the most references to a predetermined topic to sentences containing fewest references to the predetermined topic; (b) generating a plurality of n-grams from each sentence; (c) randomizing the plurality of n-grams, wherein each sentence and each of the plurality of n-grams has a corresponding best fit line curve within a multidimensional space; and (d) determining which best fit line curve of the randomized n-grams is the closest in position to the best fit line curve of the corresponding sentence in the multidimensional space. The instructions may further cause the one or more computers to analyze the plurality of submissions for uniqueness, the analyzing performed using the summaries generated for the plurality of submissions. The instructions may further cause the one or more computers to determine whether each submission is unique or not unique, the determining based on the analyzing the summaries of the plurality of submissions for uniqueness. The instructions may further cause the one or more computers to eliminate submissions that are not unique. The instructions may further cause the one or more computers to use the summaries to analyze the unique submissions for the presence of a predefined technology. Analyzing the unique submissions for the presence of a predefined technology may comprise scoring the unique submissions based on the predefined technology present in the corresponding unique submissions, and reducing the unique submissions to a predetermined number or percentage of unique submissions having highest scores.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
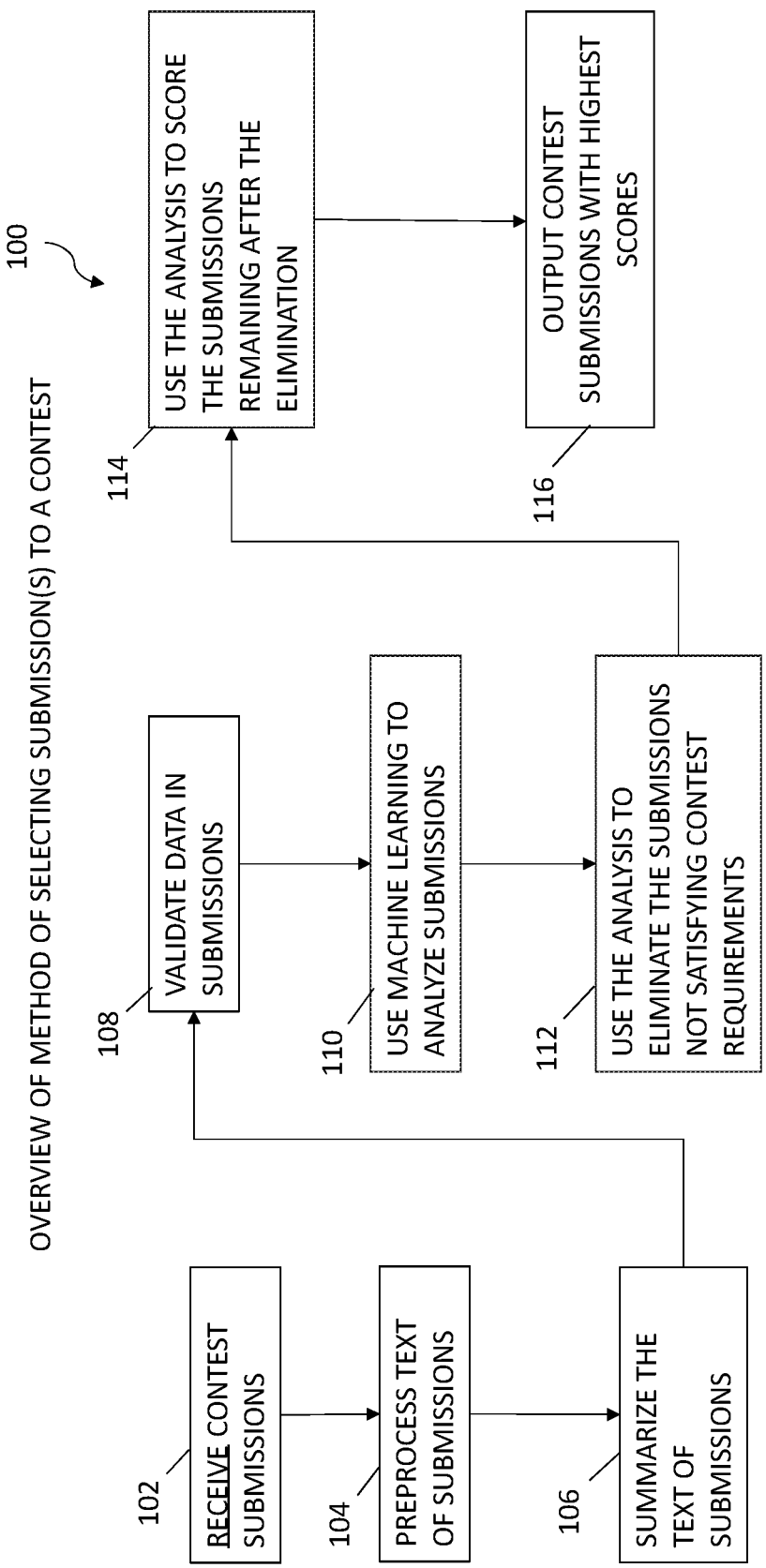
FIG. 1 is a flowchart of an overview of the method of selecting one or more submissions from a plurality of submissions to a contest according to an embodiment.

The disclosed system and method can improve a selection process by narrowing the submissions to the selection process to a reasonable number of top submissions that can be more meaningfully considered by a judge, jury, examiner, reviewer, etc. For example, the system and method may narrow 30,000 submissions down to the top 15 submissions. The top submissions may include the submissions that are the closest to meeting criteria/parameters. In some embodiments, the submissions having a score within a particular range or over a particular threshold is a top submission. By using machine learning during the selection process, human biases may be avoided, processing speed is significantly increased, accuracy of review and scoring is improved, and auditability of results is possible. For example, the disclosed system and method improve the process of selecting one or more submissions by summarizing the submissions into a minimal number of words that can be substituted for the full text of the submission in downstream processes of the selection process. Fewer words used in the downstream processes can improve the speed and efficiency of the downstream processes.

The selection processes the disclosed system and method can improve may include any selection process in which multiple inputs (or submissions) are reviewed and scored against a criteria. Examples of selection processes may include an idea or innovation contest in which submissions describe ideas or innovations, as well as RFPs in which proposals (submissions) describe qualifications for employment or available services. The disclosed system and method could help narrow down submissions to the top few submissions. Another example of a selection process may include grading papers for educational programs. The disclosed system and method could help create a scoring curve from best to worst, which may be used to assign grades to the papers. Yet another example of a selection process may include a publication selection for a professional publication, e.g., a trade journal. The disclosed system and method could help narrow down submissions for publication to the top few submissions.

In some embodiments, innovations submitted in a selection process, such as a contest, may be evaluated based on at least the following criteria/parameters: (1) uniqueness of the idea, (2) relevance to one or more predetermined themes, (3) use of one or more predetermined areas of technology, and (4) feasibility of implementation. The uniqueness can help identify whether the idea is innovative or novel with respect to what exists as of the contest date. In some embodiments, the predetermined themes may be themes designated for the contest. For example, in some embodiments, sponsors of the contest may designate themes of innovating for business (e.g., improving business processes) and innovating for society (e.g., improving way of life for individuals or communities). Accordingly, winners of the contest will be selected within each of the themes. Additionally, the submissions will be evaluated for their relationship with the themes, as the contest in this embodiment has the purpose of finding solutions related to these themes. In some embodiments, the contest may have a focus on trending areas of technology. Thus, the contest submissions may be evaluated based on the type of technology used in the solution described in the submission. Finally, in some embodiments, submissions may be evaluated on the feasibility of implementation, as a feasible solution may identify a solution that is practical to implement and thus solve a problem or improve an existing system or process. In some embodiments, submissions may be evaluated based on different or additional criteria. For example, submissions may be evaluated based on ages of the contestants (e.g., youngest individual or team). In another example, submissions may be evaluated based on existence of proof of concept.

The method of selecting one or more submissions from a plurality of submissions to a selection process may include steps performed to reduce the number of submissions to a desired number of submissions for one or more humans to evaluate or for further machine-based processing. FIG. 1 is a flowchart illustrating a method of selecting one or more submissions from a plurality of submissions to a contest 100 (method 100) according to an embodiment. The method may include receiving the submissions. For example, in some embodiments, the submissions may be submitted through a portal on a web page. In some embodiments, submissions may be submitted to and received from different sources. As shown in the example of FIG. 1, method 100 includes receiving input (operation 102). For example, the input may comprise 30K contest submissions, where each submission describes one or more ideas/innovations. In some embodiments, a data store, e.g., a data warehouse, may be created to collect and store the submissions.

In some embodiments, submissions may be formatted as tables including multiple columns. The columns may include, for example, identifying information, inventor name(s), technology identifier, problem statement, and solution description. In some embodiments, the submissions may come in as documents having multiple sections with headings, similar to the columns discussed above, or may come in as documents absent any headings, e.g., unformatted plan text files.

The method may include preprocessing the text of the submissions to put the text in a better format for analysis. For example, method 100 includes preprocessing the text of submissions (operation 104). Preprocessing may include removing stop words and noise factors, replacing missing values, lemmatizing words remaining after removing stop words, tokenizing the text (e.g., lexical analysis/splitting text strings into tokens), and/or converting text to embeddings (e.g., variables and/or vectors) that can be mapped in a multidimensional space.

The method may include generating a summary from the text of the submissions to distill the meaning of the text to a form that is easy for a machine learning process to understand and analyze. For example, method 100 includes summarizing the text of a plurality of submissions (operation 106). The method may include validating data in the submissions to make sure the data is properly tagged (operation 108). An example of tags may include tagging submissions as being within a designated theme (e.g., innovating for business) or using a trending technology (e.g., digital transformation, blockchain, big data, etc.). The method may include using machine learning to analyze submissions for presence of predetermined criteria (operation 110). In some embodiments, the criteria may include selection process (e.g., contest) requirements and/or evaluation factors weighted for scoring. The method may include using the analysis of submissions to eliminate submissions not satisfying contest requirements from consideration (operation 112). The method may include using the analysis to score the submissions remaining after elimination (operation 114). The method may include outputting contest submissions with highest scores (operation 116). In some embodiments, the analysis performed for past selection processes (e.g., contests or RFPs) and/or revisions made to the selection process by a reviewer may be used in future selection processes. For example, the decision made by the judge, jury, etc. to select a single submission out of the submissions selected using the method in a past performance may be used to select submissions in future performances of the method.

Figure 2:
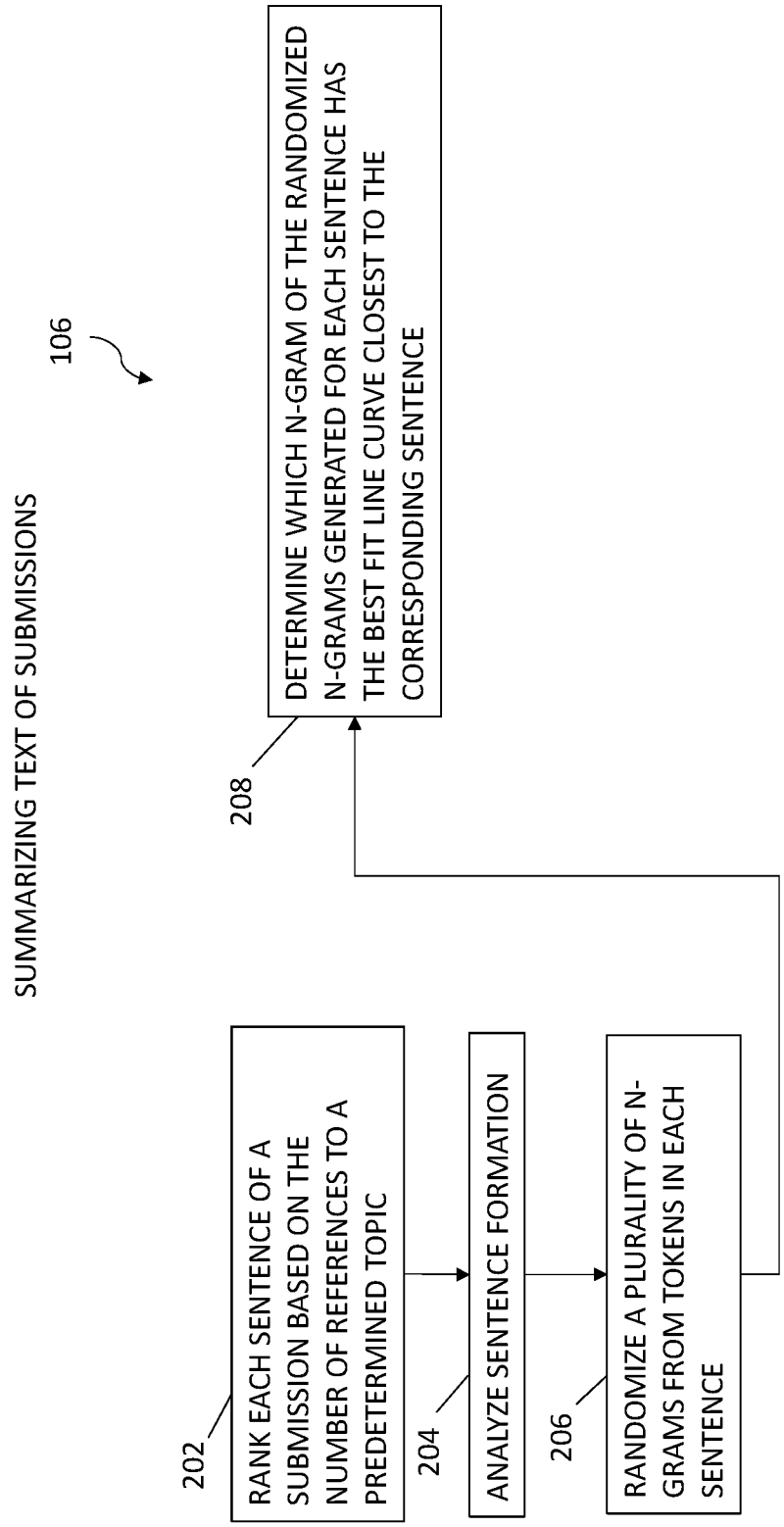
FIG. 2 is a flowchart of summarizing the text of a plurality of submissions to a contest according to an embodiment.

Some of the operations described above with respect to the overview of the method are now discussed in more detail to provide more understanding. In some embodiments, summarizing the text may include randomizing object formation and converting it to a best fit line pattern to improve usability. This operation may include reorientation/organizing patterns and analysis of sentence formation for a straight best fit line curve. For example, FIG. 2 is a flowchart showing additional detail of operation 106, summarizing the text of a plurality of submissions. Summarizing the text of submissions in the context of this disclosure may include automatically generating a summary of the text of submissions. Summarizing the text of submissions may include ranking each sentence of a submission based on the number of references to a predetermined topic (operation 202). Ranking the sentences optimizes relativity to a predetermined topic. In some embodiments, ranking the sentences may include token split analysis, which may be done during ranking or during preprocessing. Token split analysis may include splitting paragraphs into token sets. Token split analysis may provide a way of tokenizing entire paragraphs, which provides a lower level of granularity than splitting sentences into tokens. This way, a submission containing a large amount of text can be summarized with more generality, which can help with conveying the gist of the submission for quick understanding and analysis.

Summarizing the text of submissions may include analyzing sentence formation of one or more sentences of the submission (operation 204). Summarizing the text of submissions may include randomizing a plurality of n-grams from tokens in one or more sentences of the submission. For example, operation 106 includes randomizing a plurality of n-grams from tokens in each sentence (operation 206). Summarizing the text of submissions may include determining which n-gram of the randomized n-grams generated for the one or more sentences has the best fit line curve, e.g., line curve closest to the corresponding sentence. For example, operation 106 includes determining which n-gram of the randomized n-grams generated for each sentence has the best fit line curve closest to the corresponding sentence (operation 208). This operation results in reducing a sentence to the core-most words (i.e., the most essential words for understanding the sentence). For example, the sentence "I am going to school" would be summarized as "going school." The "I" part of the sentence is unnecessary in the summary because it can be inferred from other sentences surrounding this sentence. Creating a summary made up of a sentence's core-most words is different from rewriting a sentence to merely be pithy or to have a clearer sentence structure. Rather, a summary made up of a sentence's core-most words is meant to convey the meaning of the sentence quickly without regard for grammar or syntax. The summary is meant to convey the meaning of a sentence for machine learning. This means that a summary resulting from the disclosed summarization process may not make immediate sense to a human. However, the automatically generated summary can be useful in machine learning. Because the summary has a line curve in a multidimensional space that is close to the line curve of the sentence in the multidimensional space, the summary can be substituted for the corresponding sentence in downstream machine learning processes.

By reducing the words in a sentence down to the fewest necessary for still holding the essential meaning of the sentence, fewer words are necessary for downstream processes. For example, downstream analysis may include validation of data and analysis of submissions (e.g., analysis for uniqueness or relation to a specified theme or technology). In an analysis for uniqueness, as discussed in more detail with respect to FIG. 6, analyzing a plurality of submissions to a contest for a designated theme may include identifying pattern(s) of words or phrases related to the designated theme and comparing the patterns to the summary. When compared with analyzing entire sentences for patterns, this analysis of a summary with fewer words can be quicker.

It is understood that the operations performed in any of the disclosed methods or processes may be performed in any order. For example, operation 202 may occur after operations 204, 206, and 208.

In some embodiments, a confidence score may be applied to sentences in a submission. To determine a confidence score, the pattern of writing behavior may be analyzed for past, future, and present tenses. For example, Sentence 1 may say, "I am going to school;" Sentence 2 may say, "I am thinking of going to school;" and Sentence 3 may say, "I went to school." With reference to the sentences:

Sentence 1: Signifies Event is occurring, which means the Confidence of reaching school is greater than 50%.

Sentence 2: Signifies Event in a probabilistic state, which means the Confidence of reaching school is 50%.

Sentence 3: Signifies Event is already completed in past, which means this sentence has the highest confidence obtained in all three sentences.

Figure 3:
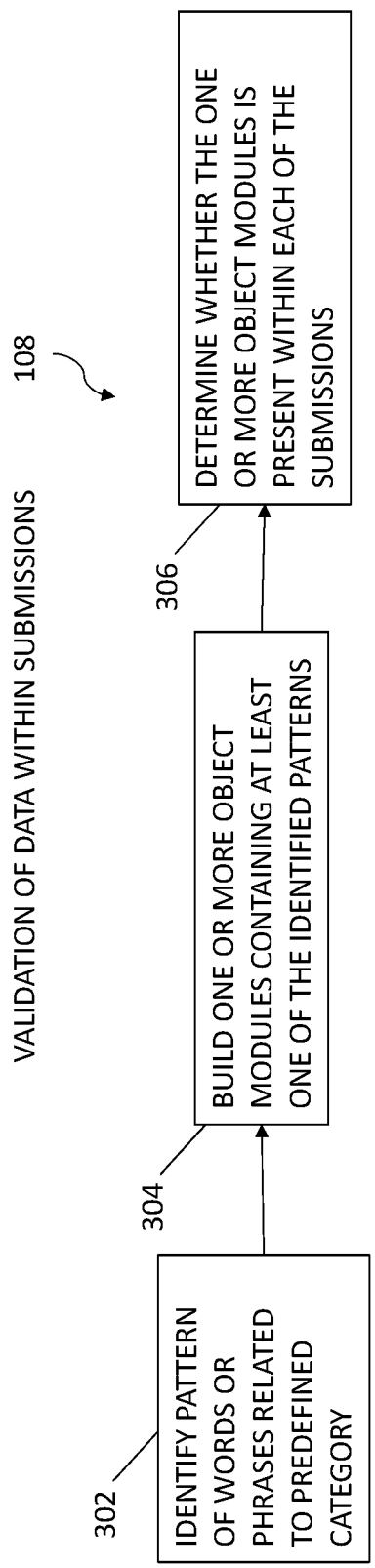
FIG. 3 is a flowchart of validating the data of a plurality of submissions to a contest according to an embodiment.

Data Validation is a process to validate structured data from the submission in terms of the required format. Data validation is part of inquisitive pattern formation based extraction and relating it into matched neural patterns of object modules created. This process may be performed using machine learning. FIG. 3 is a flowchart for validating data within a plurality of submissions to a contest (operation 108) according to an embodiment. Validating the data within submissions may include identifying pattern(s) of words or phrases related to or indicative of a predefined category (operation 302). In some embodiments, identifying pattern(s) of words or phrases may include localizing variables that are close in position to the variable representing the predefined category in a multi-dimensional space. Validating the data within submissions may include building one or more object modules containing at least one of the identified patterns (operation 304). Validating the data within submissions may include determining whether the one or more object modules is present within each of the submissions (operation 306).

In an embodiment of validating data, a submission may be submitted under the designated theme of "innovating for society", and thus may be tagged as "innovating for society" theme. In such an example, the domain is society. As mentioned above, validation of the data may include identifying pattern(s) (e.g., neural patterns) of words or phrases related to this theme/domain. For example, phrases such as, "social activities," "social awareness," and "social problem" may be identified as phrases related to or indicative of "innovating for society." Object modules containing patterns of these phrases may be built and the submissions tagged as belonging within the "innovating for society" theme may be analyzed to determine whether these patterns are present in these submissions. A subdomain in this example may include the technology used in the submission. For example, the technology may include artificial intelligence, blockchain, or data analysis. As discussed below with reference to scoring, these technologies may be ranked according to a contest selection committees' opinion as to how trendy the technology is.

Figure 4:
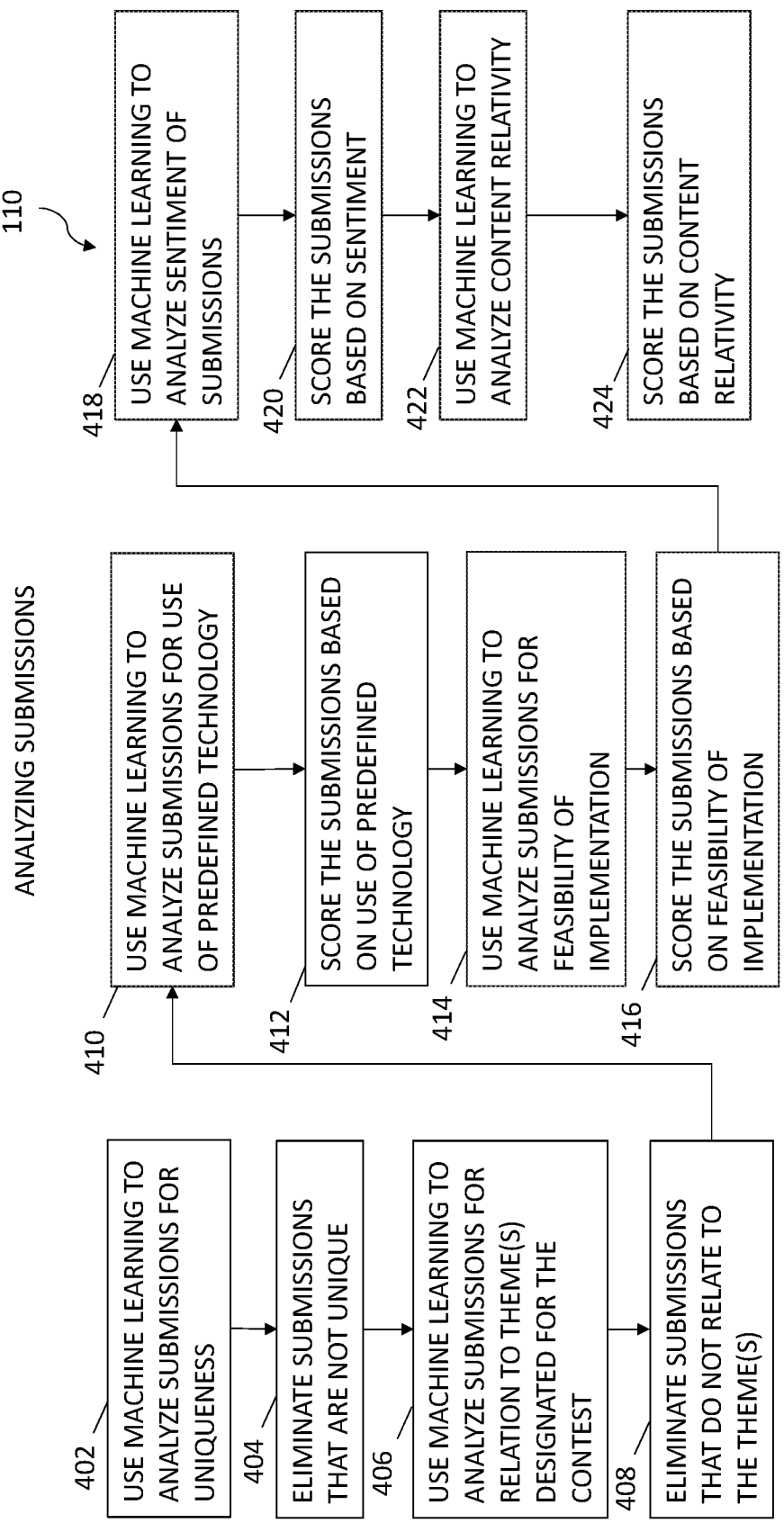
FIG. 4 is a flowchart of an overview of analyzing a plurality of submissions to a contest according to an embodiment.

FIG. 4 is a flowchart analyzing a plurality of submissions to a contest (operation 110) according to an embodiment. The analysis involves different areas of evaluation, which help improve accuracy by including multiple best line fits. Analyzing the submissions may include using machine learning to analyze submissions for uniqueness (operation 402). Analyzing the submissions may include eliminating submissions that are not unique (operation 404). Analyzing the submissions may include using machine learning to analyze submissions for relation to theme(s) designated for the contest (operation 406). Analyzing the submissions may include eliminating submissions that do not relate to the theme(s) (operation 408).

Analyzing the submissions may include using machine learning to analyze submissions for use of a predefined technology (e.g., trending technology) (operation 410). This analysis for a predetermined technology may also be called context discovery. Analyzing the submissions may include scoring the submissions based on use of predefined technology (operation 412).

Analyzing the submissions may include using machine learning to analyze submissions for feasibility of implementation (operation 414). Analyzing the submissions may include scoring the submissions based on feasibility of implementation. For example, operation 110 includes scoring the submissions based on feasibility of implementation (operation 416).

Analyzing the submissions may include using machine learning to analyze the sentiment of submissions (operation 418). Analyzing the submissions may include scoring the submissions based on sentiment (operation 420).

In some embodiments, analyzing the submissions may include using machine learning to analyze content relativity of submissions (operation 422). Analyzing the submissions may include scoring the submissions based on content relativity (operation 424).

Figure 5:
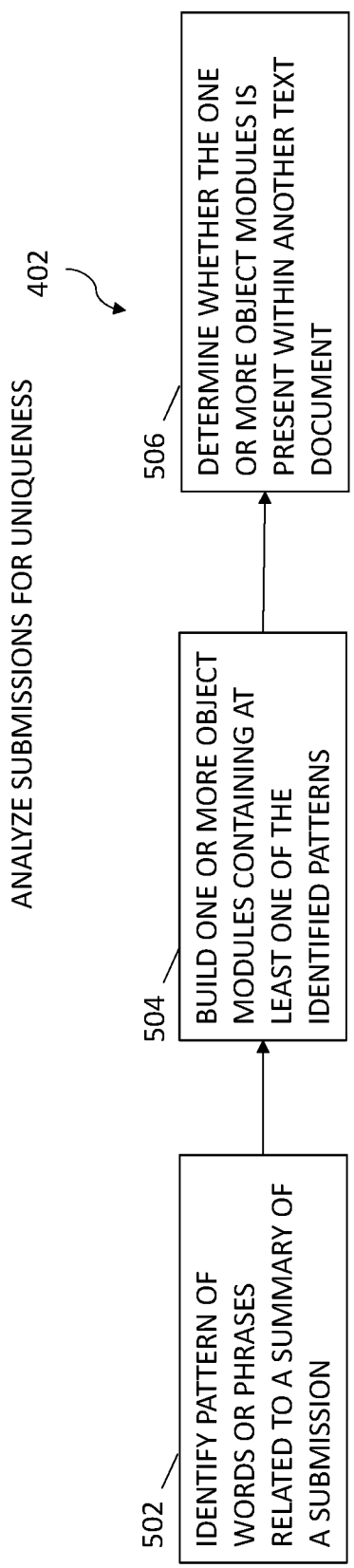
FIG. 5 is a flowchart of analyzing a plurality of submissions to a contest for uniqueness according to an embodiment.

FIG. 5 is a flowchart for analyzing a plurality of submissions to a contest for uniqueness (operation 402) according to an embodiment. Analyzing a plurality of submissions to a contest for uniqueness may include identifying a pattern of words or phrases related to a summary of a submission (operation 502). For example, in some embodiments, the words or phrases related to a summary may include some or all of the words or phrases of a summary automatically generated in the manner discussed above with respect to FIG. 2. Analyzing a plurality of submissions to a contest for uniqueness may include building one or more object modules containing at least one of the identified patterns (operation 504). Analyzing a plurality of submissions to a contest for uniqueness may include determining whether the one or more object modules is present within another text document, e.g., a publication on the internet (operation 506).

In some embodiments, analyzing a plurality of submissions to a contest for uniqueness may include pulling trend data (e.g., using Python logic to pull trend data from Google Trends), as well as descriptive, prescriptive, and predictive analytics. In some embodiments, one or more of these processes may be based on R logic. In some embodiments, analyzing a plurality of submissions to a contest for uniqueness may be done in real time by checking for an existing pattern doing raw data factorial. In one example, a submission includes a description of an innovation of a bot for hospitals. Analyzing this submission for uniqueness may include dividing the bot factor into self-learning bot, chat bot, or conversational bot. Analyzing this submission for uniqueness may include using the automatically generated summaries (described above with respect to FIG. 2) to search the internet for papers, journal articles, blogs, internet trends, social media, or other types of publications for bots related to hospitals. If the concept is not found, this concept is considered unique. If this idea is found, the concept is not considered unique or a further analysis may be performed to determine to what degree the submitted idea differs from the published idea found via the search.

Figure 6:
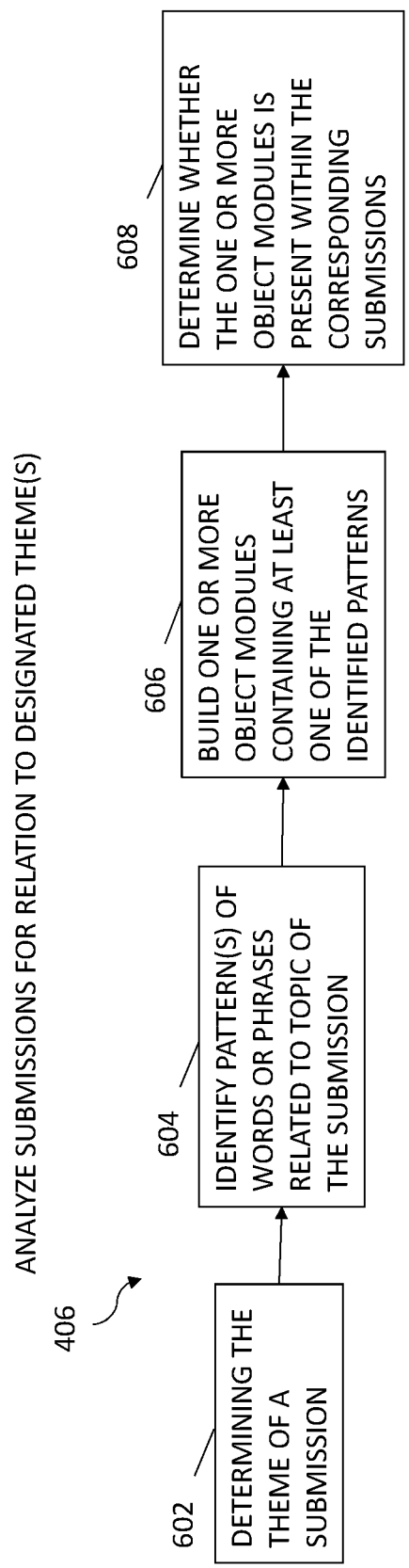
FIG. 6 is a flowchart of analyzing a plurality of submissions to a contest for relation to theme(s) designated for the contest according to an embodiment.

FIG. 6 is a flowchart of analyzing a plurality of submissions to a contest for relation to theme(s) designated for the contest (operation 406) according to an embodiment. Analyzing a plurality of submissions to a contest for relation to theme(s)/categories designated for the contest may include determining a theme of a submission (operation 602). Analyzing a plurality of submissions to a contest for relation to theme(s) designated for the contest may include identifying pattern(s) of words or phrases related to predefined theme/category (operation 604). Analyzing a plurality of submissions to a contest for relation to theme(s) designated for the contest may include building one or more object modules containing at least one of the identified patterns (operation 606). Analyzing a plurality of submissions to a contest for relation to theme(s) designated for the contest may include determining whether the one or more object modules is present within each of the submissions (operation 608).

Figure 7:
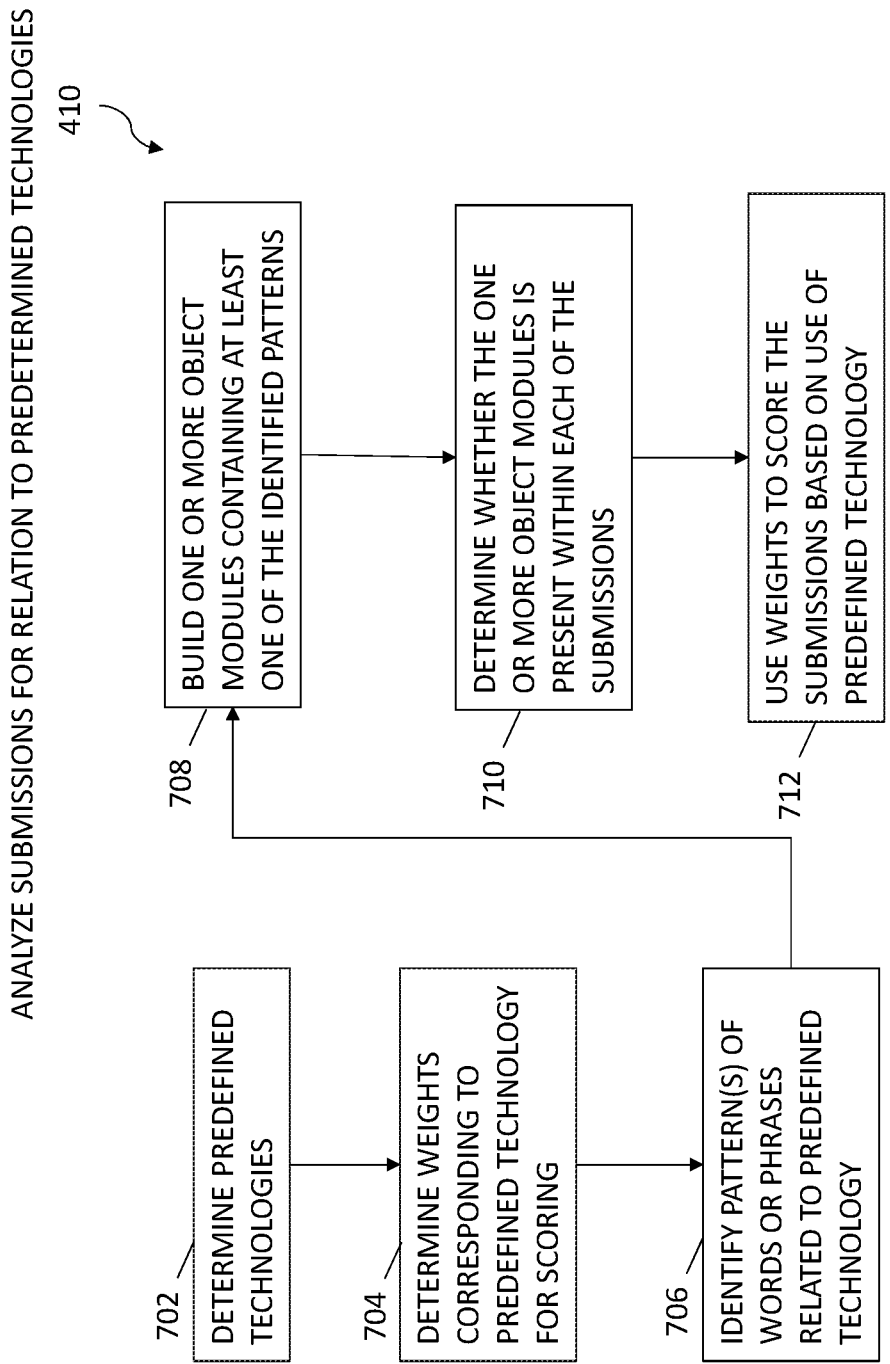
FIG. 7 is a flowchart of analyzing a plurality of submissions to a contest for relation to predetermined technologies according to an embodiment.

FIG. 7 is a flowchart of analyzing a plurality of submissions to a contest for relation to predetermined technologies (operation 410) according to an embodiment. Analyzing a plurality of submissions to a contest for relation to predetermined technologies may include determining predefined technologies (operation 702). Analyzing a plurality of submissions to a contest for relation to predetermined technologies may include determining weights corresponding to predefined technology for scoring (operation 704). Analyzing a plurality of submissions to a contest for relation to predetermined technologies may include identifying pattern(s) of words or phrases related to predefined technology (operation 706). Analyzing a plurality of submissions to a contest for relation to predetermined technologies may include building one or more object modules containing at least one of the identified patterns (operation 708).

Analyzing a plurality of submissions to a contest for relation to predetermined technologies may include determining whether the one or more object modules is present within each of the submissions (operation 710). Analyzing a plurality of submissions to a contest for relation to predetermined technologies may include using weights to score the submissions based on the use of a predefined technology (operation 712). The weights may be determined according to a contest selection committees' opinion as to how trendy each type of the technology is. For example, the technology areas may include artificial intelligence, blockchain, or data analysis. A selection committee may determine that block chain should be weighted the most and that artificial intelligence should be weighted more than data analysis.

Figure 8:
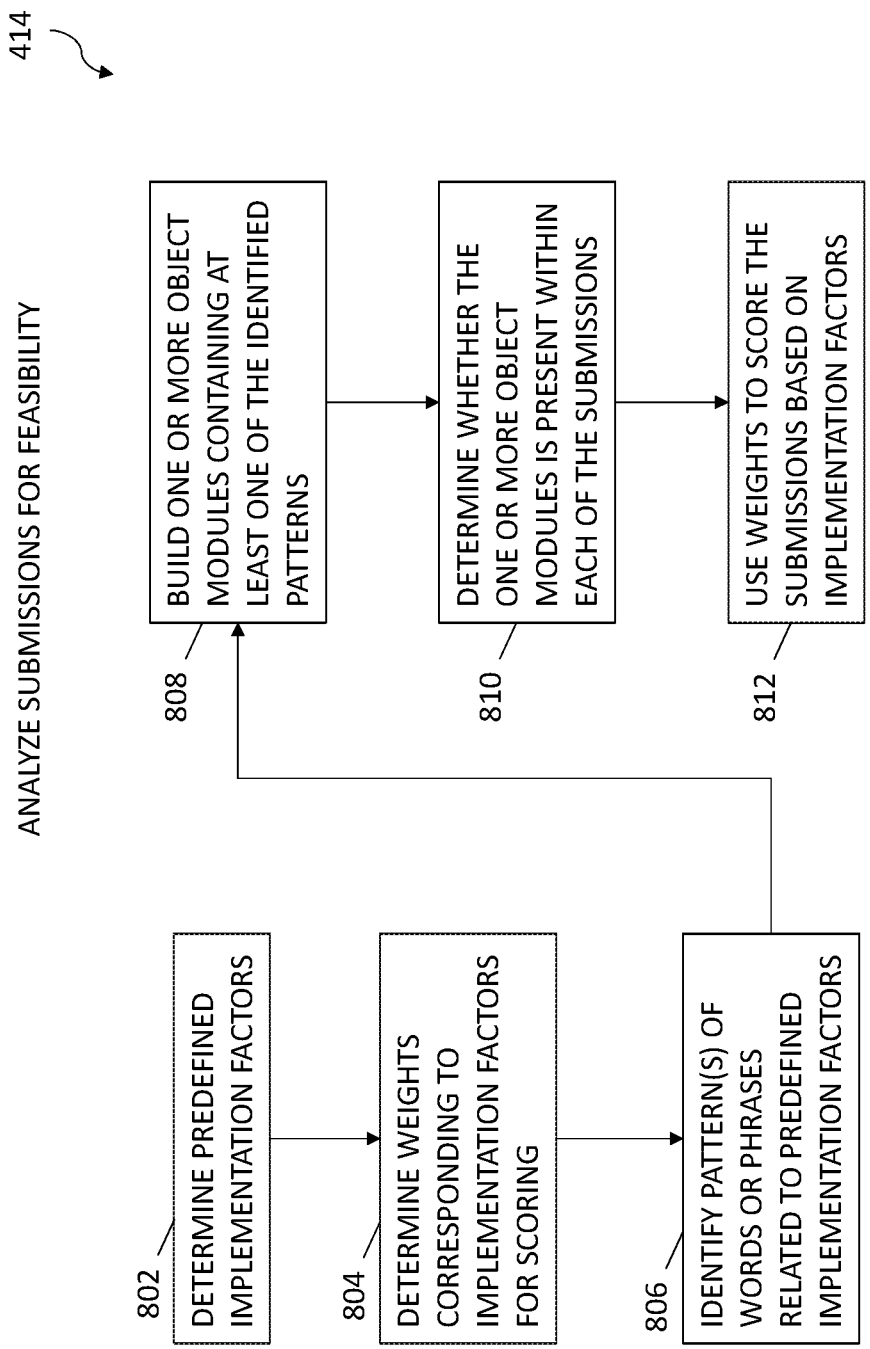
FIG. 8 is a flowchart of analyzing a plurality of submissions to a contest for feasibility according to an embodiment.

FIG. 8 is a flowchart of analyzing a plurality of submissions to a contest for feasibility (operation 414) according to an embodiment. Analyzing a plurality of submissions to a contest for feasibility may include determining predefined implementation factors, e.g., man hours, resources, testing, utility, content moderation, etc. (operation 802). Analyzing a plurality of submissions to a contest for feasibility may include determining weights corresponding to implementation factors for scoring (operation 804). Analyzing a plurality of submissions to a contest for feasibility may include identifying pattern(s) of words or phrases related to predefined implementation factors (operation 806).

Analyzing a plurality of submissions to a contest for feasibility may include building one or more object modules containing at least one of the identified patterns (operation 808). Analyzing a plurality of submissions to a contest for feasibility may include determining whether the one or more object modules is present within each of the submissions (operation 810). Analyzing a plurality of submissions to a contest for feasibility may include using weights to score the submissions based on implementation factors (operation 812).

Figure 9:
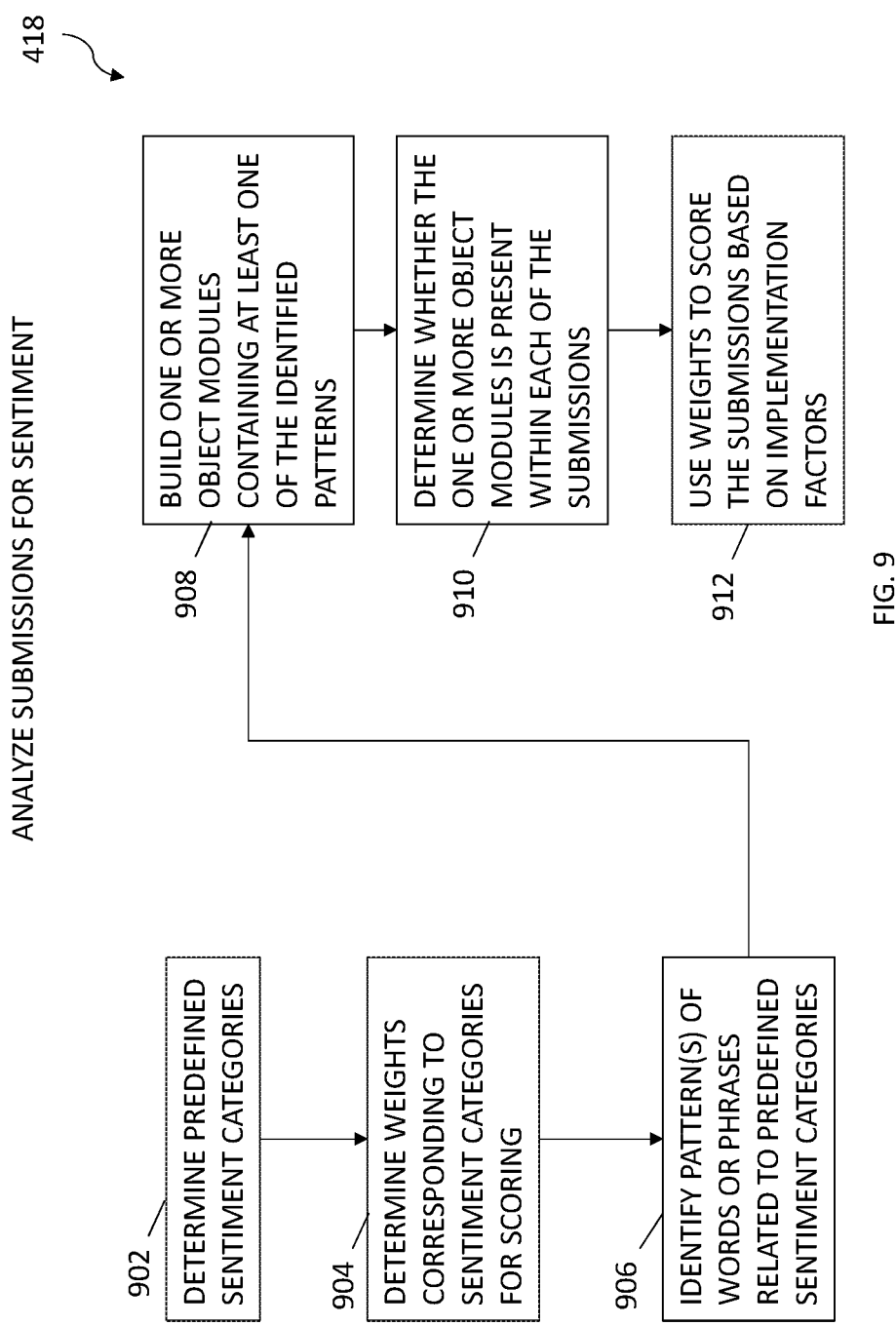
FIG. 9 is a flowchart of analyzing a plurality of submissions to a contest for sentiment according to an embodiment.

FIG. 9 is a flowchart of analyzing a plurality of submissions to a contest for sentiment (operation 418) according to an embodiment. Analyzing a plurality of submissions to a contest for sentiment may include determining predefined sentiment categories, e.g., positive, negative, neutral (operation 902). Analyzing a plurality of submissions to a contest for sentiment may include scoring the submissions based on sentiment. In one example, a submission may include description of an innovation entitled "Smart Stick," which is meant to help elderly people. This submission would be scored as a positive sentiment (e.g., "+ve") because this innovation is meant to help elderly people. In some embodiments, specific color codes may be applied to show whether a submission is tagged as positive, negative, or neutral sentiment.

Analyzing a plurality of submissions to a contest for sentiment may include determining weights corresponding to sentiment categories for scoring (operation 904). Analyzing a plurality of submissions to a contest for sentiment may include identifying pattern(s) of words or phrases related to predefined sentiment categories (operation 906). Analyzing a plurality of submissions to a contest for sentiment may include building one or more object modules containing at least one of the identified patterns (operation 908).

Analyzing a plurality of submissions to a contest for sentiment may include determining whether the one or more object modules is present within each of the submissions (operation 910). Analyzing a plurality of submissions to a contest for sentiment may include using weights to score the submissions based on implementation factors (operation 912).

Figure 10:
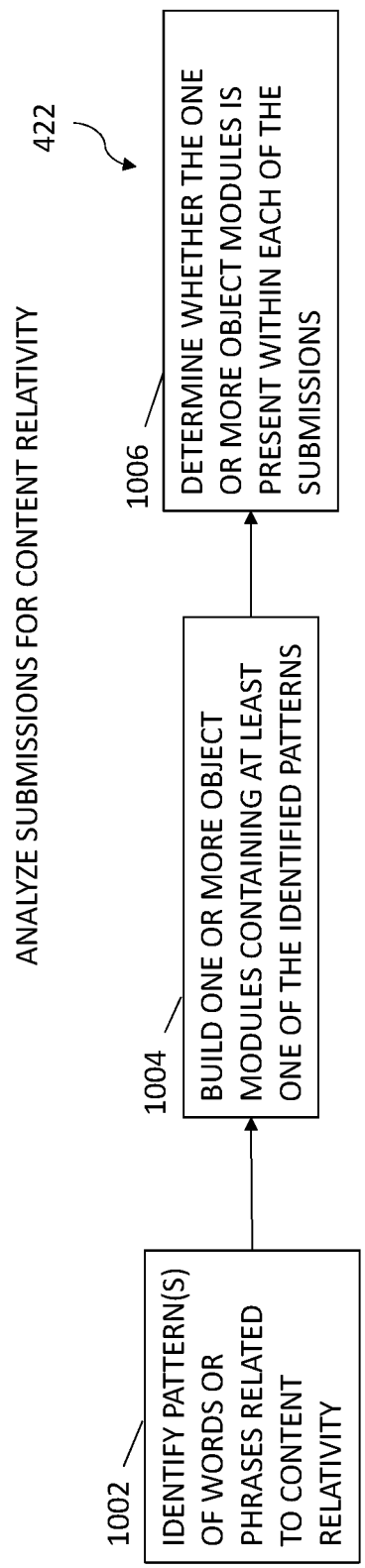
FIG. 10 is a flowchart of analyzing a plurality of submissions to a contest for content relativity according to an embodiment.

FIG. 10 is a flowchart of analyzing a plurality of submissions to a contest for content relativity (operation 422) according to an embodiment. Analyzing a plurality of submissions to a contest for content relativity may include determining the topic of a submission, e.g., cybercrime (operation 1002). The topic of a submission may be extracted during summarization of the submission. The analysis for content relativity may determine how related a submission is to its underlying topic. For example, if the topic is cybercrime, the submission should describe a problem and/or solution related to cybercrime.

Analyzing a plurality of submissions to a contest for content relativity may include identifying pattern(s) of words or phrases related to the determined submission topic (operation 1006). Analyzing a plurality of submissions to a contest for content relativity may include building one or more object modules containing at least one of the identified patterns (operation 1006). Analyzing a plurality of submissions to a contest for content relativity may include determining whether the one or more object modules is present within the corresponding submission (operation 1008).

Figure 11:
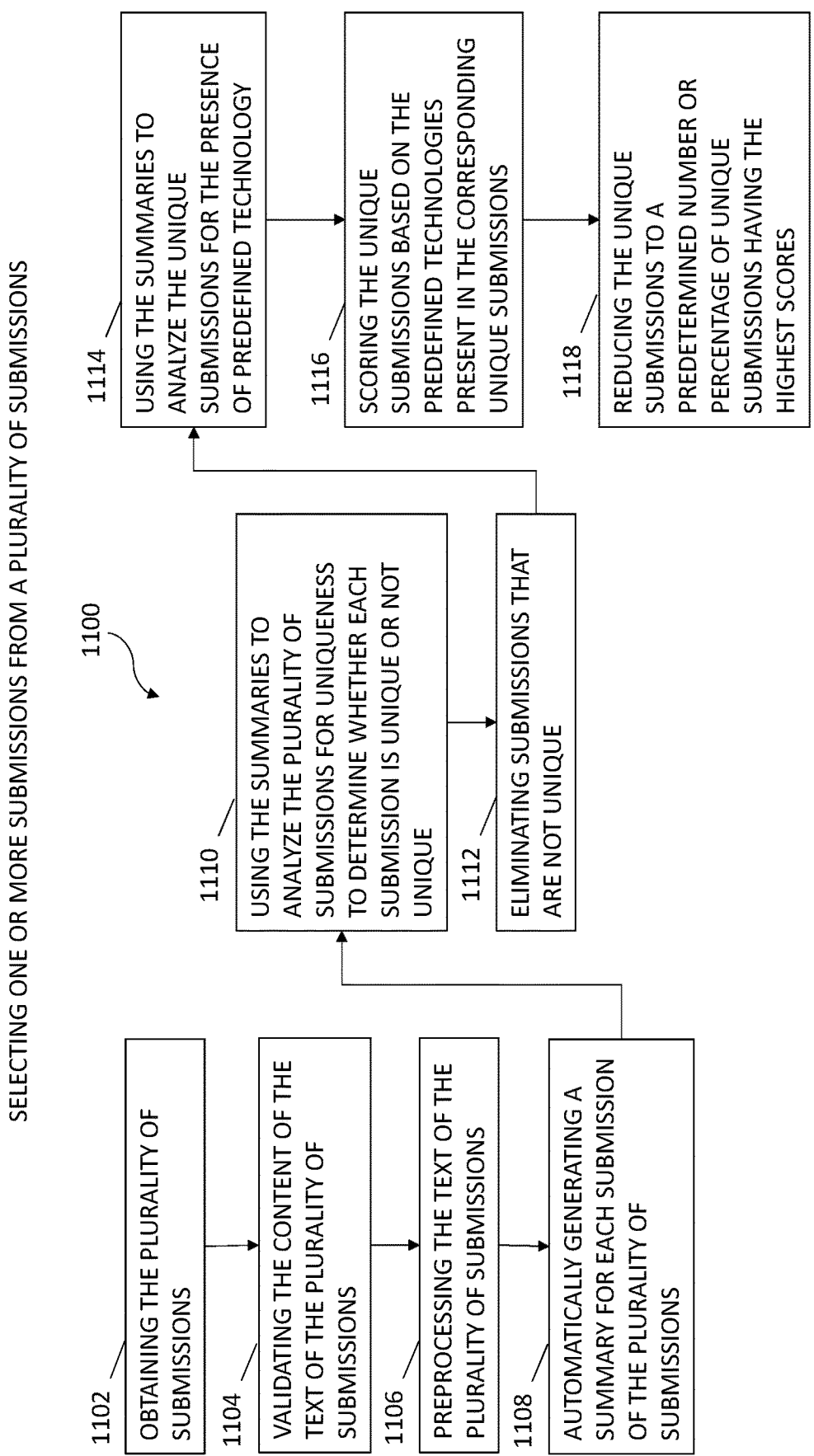
FIG. 11 is a flowchart of a method of selecting one or more submissions from a plurality of submissions to a contest according to an embodiment.

FIG. 11 is a flowchart of a method of selecting one or more submissions from a plurality of submissions to a contest 1100 (or method 1100) according to an embodiment. The method may include obtaining the plurality of submissions (operation 1102). The method may include validating the content of the text of the plurality of submissions (operation 1104). The method may include preprocessing the text of the plurality of submissions (operation 1106). The method may include automatically generating a summary for each submission of the plurality of submissions (operation 1108). This summarization may be performed by (1) ranking each sentence of the text in an order from sentences containing the most references to a predetermined topic to sentences containing less references to the predetermined topic; (2) randomizing a plurality of n-grams from the tokens in each sentence; and (3) determining which n-gram of the randomized n-grams generated for each sentence has the best fit line curve closest to the corresponding sentence.

The method may include using the summaries to analyze the plurality of submissions for uniqueness to determine whether each submission is unique or not unique (operation 1110). The method may include eliminating submissions that are not unique (operation 1112). The method may include using the summaries to analyze the unique submissions for the presence of predefined technology (operation 1114). The method may include scoring the unique submissions based on the predefined technologies present in the corresponding unique submissions (operation 1116). The method may include reducing the unique submissions to a predetermined number or percentage of unique submissions having the highest scores (operation 1118).

Examples of tools that may be used to implement the disclosed system and method include R, Python, ML Studio, Jupyter, Watson, and DataStream/API Integration. In some embodiments, the above described analysis and backtracking concept may involve modified Random forest, convolutional neural network, a recurrent neural network, and support-vector machines, calculating root mean square error (RMSE), True/False Positives, and True/False Negatives for removing complications and least error.

Figure 12:
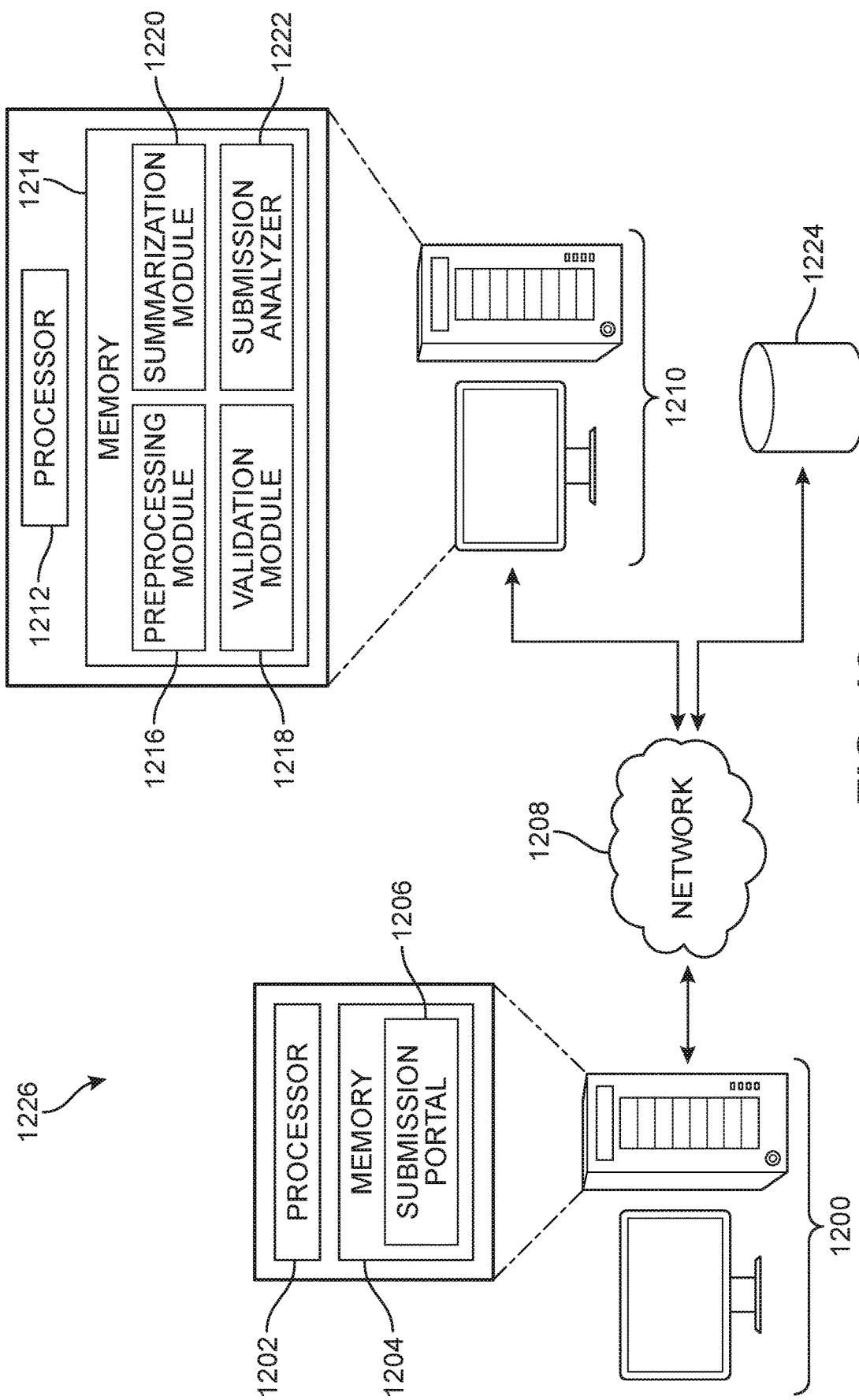
FIG. 12 shows a system for performing the disclosed method, according to an embodiment.

HG. 12 shows a system for performing the disclosed method, according to an embodiment. As shown in the embodiment of FIG. 12, a system 1226 for performing some, or all, of the steps described in the embodiments can include a first computing system 1200, a second computing system 1210, databases 1224, and a network 1208. The computing systems could include a single computer, server and/or combination of multiple computers and/or servers.

First computing system 1200 and second computing system 1210 may communicate with each other and/or one or more databases 1224 over network 1208. In some embodiments, network 1208 may be a wide area network ("WAN"), e.g., the Internet. In other embodiments, network 1208 may be a local area network ("LAN"). For example, in a more remote location far from a metropolitan area, the Internet may not be available. In yet other embodiments, network 1208 may be a combination of a WAN and a LAN.

Databases 1224 may comprise systems for storing submissions/documents.

First computing system 1200 may include at least one processor 1202 and memory 1204 for storing information, including software information and/or data. Processor 1202 may include a single device processor located on a single device, or it may include multiple device processors located on one or more physical devices. Memory 1204 may include any type of storage, which may be physically located on one physical device, or on multiple physical devices.

First computing system 1200 can include a submission portal 1206 stored within memory 204. Submission portal 1206 may include any software, processes or services used to submit documents and/or information (e.g., submissions) to be stored in databases 1224.

The memory in the first and second computing systems may include any type of storage, which may be physically located on one physical device, or on multiple physical devices.

Second computing system 1210 may include at least one processor 1212 and memory 1214 for storing information, including software information and/or data. Processor 1212 may include a single device processor located on a single device, or it may include multiple device processors located on one or more physical devices. Memory 1214 may include any type of storage, which may be physically located on one physical device, or on multiple physical devices.

Second computing system 1210 can include a preprocessing module 1216, a summarization module 1220, a validation module 1218, and a submission analyzer 1222 all stored within memory 1204. Preprocessing module 1216 may include any software, processes or services used to preprocess textual information, for example, in the manner discussed with respect to FIG. 1. Summarization module 1220 may include any software, processes or services used to summarize textual information, for example, in the manner discussed with respect to FIG. 2. Validation module 1218 may include any software, processes or services used to validate the format of information, for example, in the manner discussed with respect to FIG. 3. Submission analyzer 1222 may include any software, processes or services used to analyze textual information, for example, in the manner discussed with respect to FIGS. 4-11.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of using machine learning to select one or more submissions from a plurality of submissions, the method comprising:
   obtaining the plurality of submissions,
      each of the plurality of submissions comprising text,
      the text representing content;
   validating the content of the text,
      the validating performed for the plurality of submissions;
   preprocessing the text of the plurality of submissions, wherein preprocessing includes converting sentences within the submission into tokens;
   automatically generating a summary for each submission of the plurality of submissions by:
      ranking each sentence of the text in an order,
         the order arranged from sentences containing the most references to a predetermined topic to sentences containing fewest references to the predetermined topic;
      generating a plurality of n-grams from each sentence;
      randomizing the plurality of n-grams, wherein each sentence and each of the plurality of n-grams has a corresponding best fit line curve within a multidimensional space;
      determining which best fit line curve of the randomized n-grams is the closest in position to the best fit line curve of the corresponding sentence in the multidimensional space;
   analyzing the plurality of submissions for uniqueness,
      the analyzing performed using the summaries generated for the plurality of submissions;
   determining whether each submission is unique or not unique,
      the determining based on the analyzing the summaries of the plurality of submissions for uniqueness;
   eliminating submissions that are not unique;
   using the summaries to analyze the unique submissions for the presence of a predefined technology,
   the analyzing the unique submissions for the presence of a predefined technology comprising:
      scoring the unique submissions based on the predefined technology present in the corresponding unique submissions, and
      reducing the unique submissions to a predetermined number or percentage of unique submissions having highest scores.

2. The computer implemented method of claim 1, wherein using the summaries to analyze the plurality of submissions for uniqueness includes:
   identifying one or more patterns of words or phrases related to each summary;
   building one or more object modules containing at least one of the identified patterns; and
   determining whether the one or more object modules is present within another text document.

3. The computer implemented method of claim 2, wherein determining whether the one or more object modules is present within another text document includes searching the Internet for the object modules.

4. The computer implemented method of claim 1, further comprising:
   analyzing the plurality of submissions for relation to a theme designated for a selection process.

5. The computer implemented method of claim 4, wherein analyzing the plurality of submissions for relation to a theme designated for the selection process includes:
   identifying one or more patterns of words or phrases related to the theme;
   building one or more object modules containing at least one of the identified patterns;
   determining whether the one or more object modules is present within the submissions; and
   eliminating the submissions not containing one or more of the object modules.

6. The computer implemented method of claim 1, further comprising:
   analyzing the plurality of submissions to a selection process for relation to a theme designated for the selection process to determine whether submissions relate to the theme or not.

7. The computer implemented method of claim 6, further comprising:
   eliminating submissions that do not relate to the theme.

8. A non-transitory computer-readable medium storing software comprising instructions executable by one or more computers which, upon such execution, cause the one or more computers to:
   obtain a plurality of submissions,
      each of the plurality of submissions comprising text,
      the text representing content;
   validate the content of the text,
      the validating performed for the plurality of submissions;
   preprocess the text of the plurality of submissions, wherein preprocessing includes converting sentences within the submission into tokens;
   automatically generate a summary for each submission of the plurality of submissions by:
      ranking each sentence of the text in an order,
         the order arranged from sentences containing the most references to a predetermined topic to sentences containing fewest references to the predetermined topic;
      generating a plurality of n-grams from each sentence;
      randomizing the plurality of n-grams, wherein each sentence and each of the plurality of n-grams has a corresponding best fit line curve within a multidimensional space;
      determining which best fit line curve of the randomized n-grams is the closest in position to the best fit line curve of the corresponding sentence in the multidimensional space;
   analyze the plurality of submissions for uniqueness,
      the analyzing performed using the summaries generated for the plurality of submissions;
   determine whether each submission is unique or not unique,
      the determining based on the analyzing the summaries of the plurality of submissions for uniqueness;

eliminate submissions that are not unique;
use the summaries to analyze the unique submissions for the presence of a predefined technology,
the analyzing the unique submissions for the presence of a predefined technology comprising:
scoring the unique submissions based on the predefined technology present in the corresponding unique submissions, and
reducing the unique submissions to a predetermined number or percentage of unique submissions having highest scores.

9. The non-transitory computer-readable medium storing software of claim 8, wherein using the summaries to analyze the plurality of submissions for uniqueness includes:
identifying one or more patterns of words or phrases related to each summary;
building one or more object modules containing at least one of the identified patterns; and
determining whether the one or more object modules is present within another text document.

10. The non-transitory computer-readable medium storing software of claim 9, wherein determining whether the one or more object modules is present within another text document includes searching the Internet for the object modules.

11. The non-transitory computer-readable medium storing software of claim 8, wherein the instructions are further operable to analyze the plurality of submissions for relation to a theme designated for a selection process.

12. The non-transitory computer-readable medium storing software of claim 11, wherein analyzing the plurality of submissions for relation to a theme designated for the selection process includes:
identifying one or more patterns of words or phrases related to the theme;
building one or more object modules containing at least one of the identified patterns;
determining whether the one or more object modules is present within the submissions; and
eliminating the submissions not containing one or more of the object modules.

13. The non-transitory computer-readable medium storing software of claim 8, wherein the instructions are further operable to analyze the plurality of submissions to a selection process for relation to a theme designated for the selection process to determine whether submissions relate to the theme or not.

14. The non-transitory computer-readable medium storing software of claim 13, further comprising:
eliminating submissions that do not relate to the theme.

15. A system for using machine learning to select one or more submissions from a plurality of submissions to an innovation selection process, the submissions each containing text having content describing an innovation, comprising:
one or more computers and one or more storage devices storing instructions that are operable, when executed by the one or more computers, to cause the one or more computers to:
obtain the plurality of submissions,
each of the plurality of submissions comprising text, the text representing content;
validate the content of the text,
the validating performed for the plurality of submissions;
preprocess the text of the plurality of submissions, wherein preprocessing includes converting sentences within the submission into tokens;
automatically generate a summary for each submission of the plurality of submissions by:
ranking each sentence of the text in an order,
the order arranged from sentences containing the most references to a predetermined topic to sentences containing fewest references to the predetermined topic;
generating a plurality of n-grams from each sentence;
randomizing the plurality of n-grams, wherein each sentence and each of the plurality of n-grams has a corresponding best fit line curve within a multidimensional space;
determining which best fit line curve of the randomized n-grams is the closest in position to the best fit line curve of the corresponding sentence in the multidimensional space;
analyze the plurality of submissions for uniqueness,
the analyzing performed using the summaries generated for the plurality of submissions;
determine whether each submission is unique or not unique,
the determining based on the analyzing the summaries of the plurality of submissions for uniqueness;
eliminate submissions that are not unique;
use the summaries to analyze the unique submissions for the presence of a predefined technology,
the analyzing the unique submissions for the presence of a predefined technology comprising:
scoring the unique submissions based on the predefined technology present in the corresponding unique submissions, and
reducing the unique submissions to a predetermined number or percentage of unique submissions having highest scores.

16. The system of claim 15, wherein using the summaries to analyze the plurality of submissions for uniqueness includes:
identifying one or more patterns of words or phrases related to each summary;
building one or more object modules containing at least one of the identified patterns; and
determining whether the one or more object modules is present within another text document.

17. The system of claim 16, wherein determining whether the one or more object modules is present within another text document includes searching the Internet for the object modules.

18. The system of claim 15, wherein the instructions are further operable to analyze the plurality of submissions for relation to a theme designated for the selection process.

19. The system of claim 18, wherein analyzing the plurality of submissions for relation to a theme designated for the selection process includes:
identifying one or more patterns of words or phrases related to the theme;
building one or more object modules containing at least one of the identified patterns;
determining whether the one or more object modules is present within the submissions; and
eliminating the submissions not containing one or more of the object modules.

20. The system of claim 15, wherein the instructions are further operable to analyze the plurality of submissions to a selection process for relation to a theme designated for the selection process to determine whether submissions relate to the theme or not; and eliminating submissions that do not relate to the theme.

\* \* \* \* \*